C. POLING.
SOLID JOINT, CEMENT, REINFORCED PIPE.
APPLICATION FILED FEB. 19, 1910.
984,847.
Patented Feb. 21, 1911.
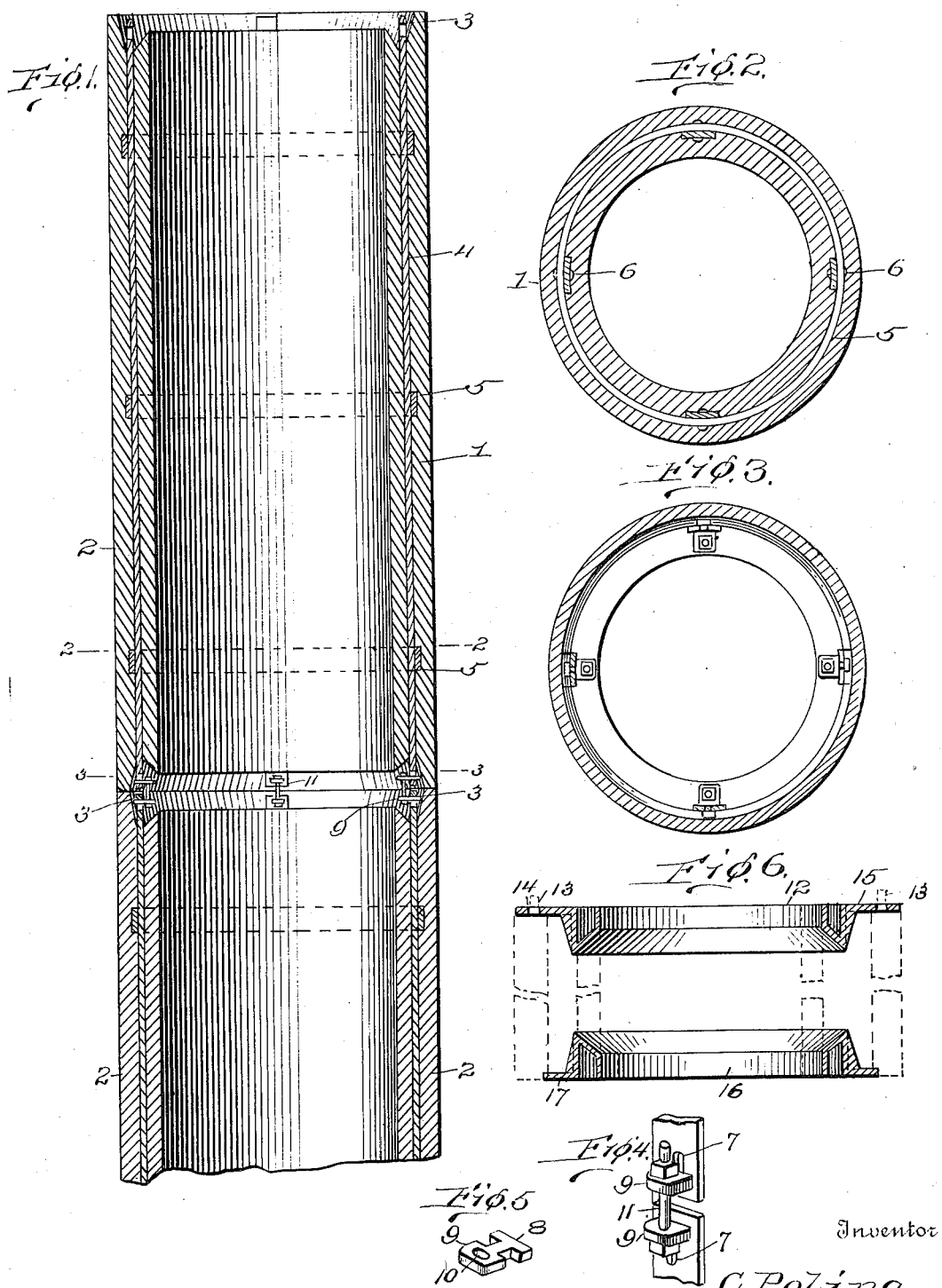

UNITED STATES PATENT OFFICE.

CRAIG POLING, OF NEBRASKA CITY, NEBRASKA, ASSIGNOR OF ONE-HALF TO FRANK M. NEVILLE.

SOLID-JOINT, CEMENT, REINFORCED PIPE.

984,847.

Specification of Letters Patent. Patented Feb. 21, 1911.

Application filed February 19, 1910. Serial No. 544,750.

*To all whom it may concern:*

Be it known that I, CRAIG POLING, a citizen of the United States, residing at Nebraska City, in the county of Otoe and State of Nebraska, have invented certain new and useful Improvements in Solid-Joint, Cement, Reinforced Pipes, of which the following is a specification.

My invention has relation to improvements in solid-joint, cement, reinforced pipes and the main object of the same is to produce such a pipe as will have the qualifications indicated by its name and one which will be durable and inexpensive to manufacture.

This pipe may be made of any size adapted for the purpose for which it is used.

A further object of the device is to provide for the covering with cement of all metallic parts thereby preventing rusting or corrosion thereof.

With the above and other objects in view this invention consists of the novel construction and arrangement of parts as are fully described in this specification, illustrated in the accompanying drawings forming a part thereof and particularly pointed out in the appended claim.

Reference being had to the drawings Figure 1 is a longitudinal, transverse section of my pipe, including one of the joints. Fig. 2 is a vertical, transverse section taken on the line 2—2 of Fig. 1. Fig. 3 is a vertical, transverse, sectional view on the line 3—3 of Fig. 1. Figs. 4 and 5 are details. Fig. 6 is a vertical, sectional view of a mold which is employed in the manufacture of the pipe sections, parts broken away. This mold provides for the manner of forming the concavities or depressions at each end of each pipe section.

Referring more particularly to the drawings my invention is described as follows: The pipe 1 is formed of cement or any other like material. Provided at each end of each pipe section 2 is a similar depression or concavity 3. Formed within the body of each pipe section 2 is a plurality of longitudinally disposed metallic strips 4, braced by means of a plurality of metallic rings or hoops 5. Each of the hoops 5 are secured to each of the longitudinal strips 4 by means of nut and bolt connections 6 or any other suitable fastening means. The strips 4 are so arranged in spaced relation to one another that when the meeting ends of two pipe sections are abutted, the strips of one pipe will coincide or correspond to those of the other. Each of the strips is slightly shortened so that they will not come in contact with one another. Cut in the ends of each strip is a longitudinal slot 7, which receives the key 8 of the lug 9, which lug is provided with a perforation 10 therein. Passing through the perforations in each two corresponding lugs is a nut and bolt connection 11. The desired tension is placed upon the lugs 9 of the strips 4, when said concavities 3 are filled with cement to the level of the inner periphery of said pipe sections, thus covering all metallic parts for the purposes heretofore stated. When the diameter of the pipe is too small to admit of the entrance of a workman the concavities 3 are then formed on the outside of the pipe sections instead of as illustrated. The mode of forming the design of the concavities and the manner of connecting the longitudinal strips, will, however, in either event, remain the same.

In the manufacture of the pipe sections the strips are first placed in the mold, illustrated in Fig. 6, together with the hoops 5, which are first secured to the strips. The cement is then filled into the top of the mold, when the cap 12 is placed in position, the pins 13 of said mold passing through corresponding perforations 14 in the flanges 15 of said cap 12. The base 16 is similar to said cap with the exception of the flanges 15 and the perforations 14, the flange 17 being not so wide as the flange 15 and not containing any perforations.

Although I have specifically described the construction of my invention yet I may claim the right to make such changes therein as do not depart from the spirit of the invention or the scope of the claim.

Having described my invention what I claim as new, is:

In a cement pipe of the kind described, comprising pipe sections joined together, each of said sections provided with longitudinal strips, each pipe section provided with a concavity in each of its ends, each metallic strip having its ends protruding into its respective concavity, a longitudinal perforations provided in each of the ends of each strip, an inwardly projecting lug provided with a key received by each longitudinal perforation in each strip, said lugs having their faces parallel to each other when in normal position, each of said lugs provided with a corresponding perforation, means comprising a nut and bolt connection to connect the lugs of the meeting ends of each two corresponding strips in the adjacent pipe sections, the bolt of said nut and bolt connection passing through the perforations in each two corresponding lugs.

In testimony whereof I affix my signature, in presence of two witnesses.

CRAIG POLING.

Witnesses:
 FRANK M. NEVILLE,
 LEE SQUIRES.